Patented Nov. 19, 1940

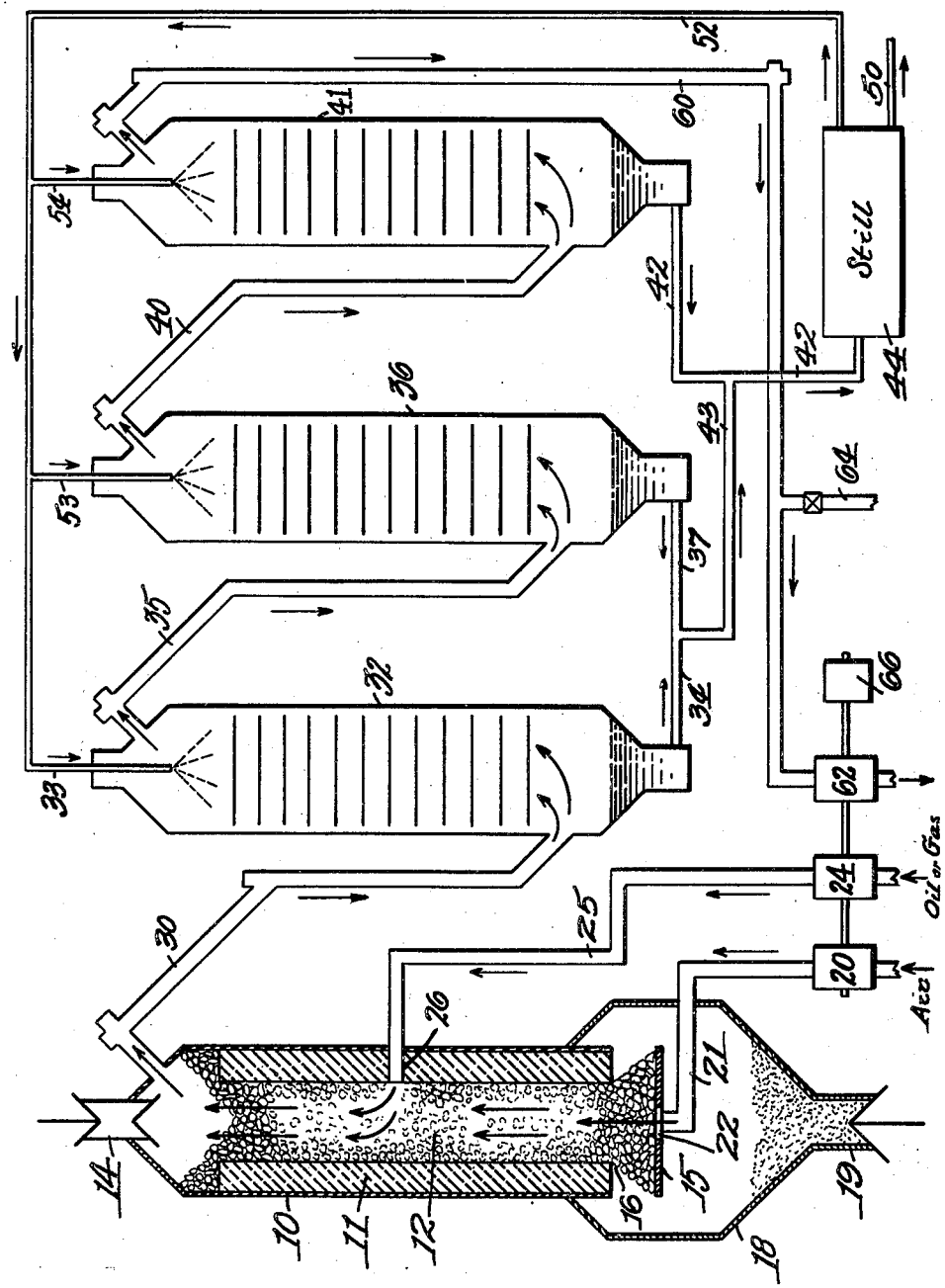

2,222,489

UNITED STATES PATENT OFFICE 2,222,489

METHOD FOR TREATMENT OF HYDROCARBONS

Lewis W. Riggs, Watertown, Mass., assignor of one-half to R. M. Chatterton, Malden, Mass.

Application December 27, 1937, Serial No. 181,779

4 Claims. (Cl. 196—67)

This invention relates to methods adapted for treatment of hydrocarbon compounds, and by which desired products may be obtained from selected compounds.

The apparatus hereinafter described is well adapted to handle hydrocarbon compounds varying from gases to heavy oils, and to produce therefrom a considerable range of products, such as gasoline, light oils and lubricants.

It is the general object of my invention to provide improved apparatus and a novel method of operation by which a portion only of a selected hydrocarbon compound may be burned in a kiln under substantial pressure and in the presence of a heated refractory. The soot resulting from such partial combustion will be deposited on said refractory. The proportion of the hydrocarbon compound consumed is preferably controlled by regulating and limiting the amount of air supplied to the kiln, relative to the amount of the hydrocarbon compound fed thereto.

Provision is also made for causing the refractory material to move gradually downward in the kiln toward the air inlet near the bottom thereof and away from the oil or gas inlet, which is at a higher level.

The soot deposited on the refractory is consumed as the refractory moves downward and furnishes additional heat for further raising the temperature of the remaining hydrocarbon compound and for heating the fresh refractory which is periodically charged at the top of the kiln.

The unconsumed portion of the hydrocarbon compound is thus subjected to heat and pressure conditions which evolve new and more desirable compounds therefrom. These new compounds leave the kiln as oil vapors and gases and are thereafter separated and collected by any usual and suitable means.

Another feature of the invention relates to the provision of means, such as positive displacement pumps, by which a liquid or gaseous hydrocarbon compound and air may be introduced to a kiln under substantial pressure and in fixed and predetermined proportions. I also contemplate operating such pumps or other injecting apparatus by power derived from combustion of certain non-condensible gases discharged from the apparatus.

My invention further relates to arrangements and combinations of parts and to certain ordered steps of procedure which will be hereinafter described and more particularly pointed out in the appended claims.

A preferred form of apparatus suitable for use in connection with my improved method is shown in the drawing which is in diagrammatic form.

This apparatus comprises a kiln 10 provided with a fire-brick or other suitable refractory lining 11 and substantially filled, when in operation, with a loose permeable refractory material 12.

A suitable charging device 14 is provided at the top of the kiln, through which fresh refractory material 12 may be supplied from time to time during the operation of the apparatus. A bottom plate 15 is spaced below the body of the kiln 10 and provides an annular discharge opening 16 for the kiln. The refractory material 12 moves gradually downward in the kiln and is slowly discharged through the annular opening 16 into a hopper or storage bin 18, from which it may be removed as desired, through an outlet 19 when the apparatus is not under pressure.

An air pump 20 is connected by an air supply pipe 21 to an opening 22 in the bottom plate 15. A second pump 24 is connected by a pipe 25 to an opening 26 through the side of the kiln, which opening 26 is located in the middle or upper portion of the kiln. The pump 24 and pipe 25 supply the hydrocarbon compound, whether gaseous or liquid, which is to be treated in the kiln 10. The pumps 20 and 24 are preferably of the positive displacement type and are driven in fixed speed relation, so that the proportion of air to hydrocarbon compounds in definite and predetermined relation.

The new and desired hydrocarbon compounds which are evolved in the kiln 10, together with combustion gases, pass off through a discharge pipe 30 to suitable apparatus for separating the desired products from the non-condensible gases and for removing and collecting said products.

In the drawing, for purposes of illustration, I have indicated the pipe 30 as connected to the lower end of a washer or absorber 32, into the upper portion of which an oil spray is injected through a pipe 33. As the gases and vapors pass upward through the absorber, certain condensible compounds are absorbed by the oil spray. The oil and absorbed compounds collect at the lower end of the absorber and are removed through a pipe 34.

The uncondensed gases and vapors may then pass through a second discharge pipe 35 to a second absorber 36, from which additional oil with further absorbed compounds is removed through a pipe 37.

If further absorption of gases and vapors is desired, a third gas discharge pipe 40 and a third absorber 41 may be provided, and additional oil with absorbed compounds may be removed through a pipe 42.

The oil discharge pipes 34 and 37 may be connected by a pipe 43 to the discharge pipe 42, which in turn is connected to a still 44 of any usual type, in which the absorbed hydrocarbon compounds, such as gasoline or oil, are removed from the absorber oil and may be discharged through a pipe 50 to storage.

The absorber oil, stripped of its absorbed compounds, is returned through a pipe 52 to the spray-pipe 33 previously described. Additional branch spray pipes 53 and 54 will be provided for the absorbers 36 and 41.

The non-condensible gases discharged from the third absorber 41 are preferably delivered through a pipe 60 to a gas turbine, engine or motor 62 which provides power for driving the pumps 20 and 24. If more gas is discharged through the pipe 60 than is required to furnish power to drive the pumps 20 and 24, the surplus gas may be removed through a pipe 64 and may be conducted to storage or otherwise utilized as desired. On the other hand, if the discharged gases do not furnish enough power to operate the pumps, supplemental driving power may be provided by an electric or other auxiliary motor 66.

Having described a novel form of apparatus well adapted to my intended purposes, I will now describe the operation thereof when supplied with hydrocarbon compounds of different types.

I will first describe the use of the apparatus in connection with my improved method in forming desired liquid hydrocarbon compounds from compounds which are gases or oil vapors of low molecular weight at atmospheric pressure and ordinary temperature.

Let it be assumed that the pump 24 delivers such gases or oil vapors through the pipe 25 to the kiln 10 under substantial pressure, such as 500 lbs. per square inch. The air pump 20 will be adjusted and operated to deliver air through the pipe 21 at corresponding pressure, and the proportion of air to gas or vapor will be definitely fixed by the positive speed and displacement relations of the pumps 20 and 24.

Assuming that the apparatus has been operating for a sufficient period to establish normal conditions, the refractory 12 in the kiln 10 will have been heated to a moderately high temperature, such as 1400° F., and the material 12 will be gradually feeding downward through the kiln and out of the annular discharge opening 16 to the hopper or storage bin 18.

As gas or oil vapor is injected into this mass of heated coke or other refractory, a part of the gas or vapor will be consumed by the action of the air supplied through the pipe 21. The amount of air, however, is definitely limited, so that only a part of the gas or vapor will be consumed, while the remaining unconsumed gas or vapor passes up through the heated refractory under conditions of relatively high pressure and temperature.

The combustion of a part of this gaseous hydrocarbon compound causes soot to be deposited on the loose refractory, but this soot is carried downward with the refractory and is consumed as it meets the in-coming air supply. This burning of the soot provides additional heat for maintaining the temperature of the kiln and for heating up fresh refractory fed into the kiln through the charging device 14. Not only is heat conserved, but clogging of the apparatus by soot is effectively avoided as the soot is moved continuously downward from the cracking zone as rapidly as it is formed.

In the upper part of the kiln, conditions of heat and pressure are such that the unconsumed hydrocarbon gases or vapors of low molecular weight are subjected to polymerizing conditions, under which they tend to coalesce and to form desired hydrocarbon compounds which are normally liquid at atmospheric pressure and at ordinary temperature. In the ordinary operation of my improved apparatus, the major portion of the introduced gas or vapor is available for polymerization.

These polymerized gases and vapors, together with combustion and other gases, then pass off through the discharge pipe 30 and are recovered in the absorber 32, 36 and 41 and in the still 44, all as previously described.

My improved process is highly economical, as the necessary power is derived largely or wholly from noncondensible gases discharged from the apparatus, the soot is entirely consumed, so that continuous operation is possible, and the discharged refractory may be recharged for repeated use.

My improved apparatus and method may also be applied to the treatment of heavy oils of 10° Baumé or less for the production of gasoline. For such purposes, heavy oil instead of gas or oil vapor is introduced through the pipe 25 and opening 26 by the pump 24. The air supply is limited to provide combustion of a part of the oil only, and the conditions of pressure and temperature are so maintained that the unconsumed part of the oil encounters gasoline-cracking conditions in the upper portion of the kiln.

The pressure and temperature conditions previously described, namely 500 pounds pressure and 1400° F. temperature, are suitable for cracking certain heavy oils to produce gasoline, and these conditions may be varied upward or downward as necessary to provide cracking conditions for other oils. The soot produced by combustion of a part of the heavy oil is deposited on the loose refractory and is carried downward in the kiln for combustion by the in-coming air supply, all as previously described.

The gasoline vapors, combustion gases and other gaseous products are discharged through the pipe 30 to the absorbers 32, 36 and 42, and to the still 44 or other suitable separating and collecting apparatus, all as previously described.

A third application of my improved apparatus and method of operation is in the conversion of oils of the common paraffin series having no lubricating value into other oils preferably containing diacetylenes and having high lubricating values.

For this purpose my improved apparatus is operated as previously described, except that oils of the common paraffin series containing a high proportion of hydrogen are supplied to the kiln by the pump 24 and a portion thereof is consumed in the kiln by the limited amount of air supplied thereto.

The general object of the treatment of such common paraffin oils in my apparatus is to reduce the weight of hydrogen, which may be twenty percent in the original oil, to a much lower percentage in the resulting product, commonly to about two percent by weight. This may be accomplished by cracking the common paraffin oil under such conditions of temperature and pressure that the cracking operation is not carried beyond the point at which lubricating oils will result, which oils should be of rather high viscosity but low in hydrogen content.

Such conditions obtain with my apparatus if it is operated at a relatively low temperature, such as 600° F., and at a relatively high pressure, such as 1200 pounds to the square inch. While these figures are subject to variation, it is considered desirable that such proportions be maintained that the pressure in pounds per square inch is substantially double the temperature in degrees Fahrenheit.

In practical operation, it is also necessary that the paraffin oil be exposed to the required conditions of temperature and pressure for a time interval definitely proportionate to the temperature and pressure. A higher temperature will permit reduction of the time interval, and a higher pressure and lower temperature will permit longer exposure of the oil to cracking conditions. If, however, the temperature is too high, the pressure is too low, or the exposure too long, the oil may be cracked beyond the diacetylene series into the aromatic series, which latter oils have substantially no lubricating value.

Having thus described three applications of my improved apparatus and method, it will be evident that my invention is adapted for the treatment of a wide range of hydrocarbon compounds and I do not wish to be limited to the applications herein described, otherwise than as set forth in the claims, but what I claim is:

1. The method of treating hydrocarbon compounds which consists in providing a kiln largely filled with a column of loose heated refractory, causing said refractory to move gradually downward in said kiln, injecting a hydrocarbon compound at a point substantially below the top of said column, injecting a quantity of air in the lower part of said kiln, maintaining a predetermined ratio of air and hydrocarbon supplied and limiting the air to that amount which will support combustion of a part only of said compound, depositing the resultant soot on the heated refractory, consuming said soot in the lower portion of said kiln as the refractory moves downward, maintaining a pressure in excess of 300 pounds per square inch in said kiln and a relatively high temperature, and removing, separating and collecting the newly formed hydrocarbon compound produced under said defined conditions of operation.

2. The method of treating hydrocarbon gases and vapors which consists in providing a kiln largely filled with a column of loose heated refractory, causing said refractory to move gradually downward in said kiln, injecting hydrocarbon liquids and vapors at a point substantially below the top of said column maintaining a pressure of approximately 500 pounds per square inch and a temperature of approximately 1400° F. in said kiln, injecting a quantity of air to the lower part of said kiln and limiting the air to that amount which will support combustion of a part only of said liquids and vapors, depositing the resultant soot on the heated refractory, consuming said soot in the lower portion of said refractory column, and removing, separating and collecting newly formed hydrocarbons from said kiln which are liquid at atmospheric pressure and ordinary temperature.

3. The method of treating a non-lubricating paraffin compound high in hydrogen which consists in providing a kiln largely filled with loose, heated refractory, causing said refractory to move gradually downward in said kiln, injecting a non-lubricating paraffine compound in a higher part of said kiln, injecting a quantity of air in the lower part of said kiln limited in amount to support combustion of a part only of said paraffine compound, maintaining a temperature of approximately 600° F. and a pressure of approximately 1200 pounds per square inch in said kiln, depositing the resultant soot on the heated refractory and thereafter consuming said soot as the refractory moves downward, and removing, separating and collecting newly formed hydrocarbons low in hydrogen and possessing substantial lubricating properties.

4. The method of treating a non-lubricating paraffin compound high in hydrogen which consists in providing a kiln largely filled with loose, heated refractory, causing said refractory to move gradually downward in said kiln, injecting a non-lubricating paraffin compound in a higher part of said kiln, injecting a quantity of air in the lower part of said kiln limited in amount to support combustion of a part only of said paraffin compound, maintaining temperature and pressure conditions substantially in excess of atmospheric and in which the pressure in pounds per square inch is at least double the temperature in degrees F., depositing the resultant soot on the heated refractory and thereafter consuming said soot as the refractory moves downward, and removing, separating and collecting newly formed hydrocarbons low in hydrogen and possessing substantial lubricating properties.

LEWIS W. RIGGS.